United States Patent [19]

Hachiya et al.

[11] Patent Number: 5,875,076
[45] Date of Patent: Feb. 23, 1999

[54] ASYMMETRICAL ACTUATOR STRUCTURE FOR RECORDING-REPRODUCING APPARATUS

[75] Inventors: Toshiyuki Hachiya; Hiroshi Suzuki, both of Higashine, Japan

[73] Assignee: Fujitsu Limited, Kawasaki, Japan

[21] Appl. No.: 744,092

[22] Filed: Nov. 5, 1996

[30] Foreign Application Priority Data

Apr. 12, 1996 [JP] Japan .................................. 8-091318

[51] Int. Cl.$^6$ ....................................................... G11B 5/55
[52] U.S. Cl. .............................................................. 360/106
[58] Field of Search ............................................... 360/106

[56] References Cited

U.S. PATENT DOCUMENTS 5,404,257  4/1995  Alt ........................................... 360/106

FOREIGN PATENT DOCUMENTS 1-113966  5/1989  Japan .
4-134764  5/1992  Japan .
6-76499   3/1994  Japan .

Primary Examiner—A. J. Heinz
Attorney, Agent, or Firm—Greer, Burns & Crain, Ltd.

[57] ABSTRACT

An actuator structure includes an arm portion carrying a predetermined number of heads for recording/reproducing information, provided on one side of a rotary shaft, and at least two coil support portions, each of which supports a coil member for moving the heads on recording media, provided on the other side of the rotary shaft relative to the arm portion. Each of the at least two coil support portions extends from either side of a line passing through the head and the rotary shaft, and the at least two coil support portions are formed asymmetrically relative to the line.

16 Claims, 11 Drawing Sheets

ASYMMETRICAL ACTUATOR STRUCTURE FOR RECORDING-REPRODUCING APPARATUS

BACKGROUND OF THE INVENTION

1. Field of the Invention

The present invention generally relates to an actuator structure and a recording-reproducing apparatus, and more particularly, to an actuator structure which is capable of moving a head for recording and/or reproducing information to a predetermined position of a recording medium and a recording-reproducing apparatus provided with such an actuator structure.

2. Description of the Related Art

Recently, a recording-reproducing apparatus such as a magnetic disk apparatus has been downsized and its capacity has been increased. Due to the increase of its capacity, in particular, TPI (track per inch) has also increased and so a track pitch has narrowed. For this reason, demands have been increased for a high-speed seek and a high-accuracy positioning.

FIG. 1 is a plan view of an actuator portion of a conventional magnetic disk apparatus 11. FIG. 2 is a cross-sectional view of the actuator portion shown in FIG. 1. In FIGS. 1 and 2, a predetermined number of magnetic disks 13 (two in FIG. 2) are rotated by a spindle motor (not shown) in a base 12 of the magnetic disk apparatus 11. A magnetic head 14 is moved in a radial direction by an actuator 15 on each surface of the magnetic disks 13.

The actuator 15 is comprised, integrally, of a rotary shaft 18, which is formed by a shaft 16 and bearings 17, and arms 19, a number of which corresponds to a number (of recording surfaces) of the magnetic disks 13, provided for each of the magnetic disks 13. A gimbal 20 is fixed to a tip of each of the arms 19 and the magnetic head 14 is formed on each of the gimbals 20 so as to oppose each recording surface of the magnetic disks 13.

On the other hand, two coil support portions 21a and 21b are integrally and symmetrically formed on the other side of the magnetic disk 14 and a voice coil 22 is fixed to a U-shaped end portion formed by the coil support portions 21a and 21b using an adhesive 23. The voice coil 22 is formed by winding the coil a predetermined number of times.

A magnet 25 fixed to a yoke 24 is provided above the voice coil 22 and a magnet 27 fixed to a yoke 26 is provided underneath the voice coil 22. Each of the magnets 25 and 27 is placed so that opposed polarities face each other. Studs 28a and 28b covered by rubber members 29a and 29b, respectively are provided at left and right sides of the yokes 24 and 26. Each of the rubber members 29a and 29b, respectively, functions as a stopper which contacts the coil support portion 21a or 21b when the actuator 15 rotates around the rotation shaft 18. In addition, the numeral 30 indicates an FPC (flexible printed circuit) which supplies current to the voice coil 22 and send/receive signals to/from the magnetic head 14.

FIG. 3 is a cross-sectional view of another conventional actuator structure. In FIG. 3, a cradle 21c for the voice coil 22 is provided at a lower portion between the coil support 22 and 21b. The cradle 21c is formed of, for example, a resin or an aluminum plate, and fixed by bolts. Other configurations are the same as the ones shown in FIG. 2. The cradle 21c prevents a generation of resonance during a driving of the actuator 15 (during power supply to the voice coil 22) by enhancing a fixation state of the voice coil 22.

The reason that the voice coil 22 is supported by the coil support portions 21a and 21b at each end is to improve an accuracy of positioning, seek speed, etc., since the track pitch is shortened due to a high TPI associated with a high-capacity magnetic disk apparatus. Also, the doughnut shape of the voice coil 22 contributes to minimize inertia.

However, if the thickness of the above-mentioned coil support portions 21a and 21b is reduced in order to achieve a weight reduction, their rigidity will be also reduced and torsional vibration will be caused during an operation of the disk apparatus. Especially, since the coil support portions 21a and 21b are symmetrically formed, they tend to help or enhance the torsional vibration. Once this vibration is transferred to the magnetic head 14, it is difficult to carry out a positioning with high accuracy.

Also, as shown in FIG. 1, since lines from both ends of the side $22a_1$ to the shaft 16 (rotation center) are deviated from the lines $22b_1$ and $22b_2$, respectively, efficiency of the magnetic circuit is not very good. Thus, more power is consumed and the high-speed seek and accurate positioning are influenced by such factors.

Moreover, to provide the cradle 21c in order to decrease the resonance during the operation of the above-mentioned coil support portions 21a and 21b causes widening of an air gap of the magnetic circuit formed by the voice coil 22, magnets 25 and 27, and yokes 24 and 26. Thus, sufficient magnetic flux density cannot be obtained and the efficiency of the magnetic circuit is lowered. Also, problems such as a high cost due to an increased number of parts and an increased number of construction steps are caused.

SUMMARY OF THE INVENTION

Accordingly, it is a general object of this invention to provide an actuator structure in which the above-mentioned problems are eliminated.

Another object of this invention is to provide a recording-reproducing apparatus using the actuator structure in which the above-mentioned problems are eliminated.

A more specific object of the present invention is to provide an actuator structure and a recording-reproducing apparatus by which the above-mentioned high-speed seek and the positioning with high accuracy can be achieved.

Another specific object of the present invention is to provide an actuator structure and a recording-reproducing apparatus by which the cost necessary for a rotary mechanism may be decreased.

Yet another object of the present invention is to provide an actuator structure and a recording-reproducing apparatus having a reduced weight yet satisfying requirements for speeding up a rotary mechanism and/or a spindle mechanism.

The objects described above are achieved by an actuator structure comprising: an arm portion carrying a predetermined number of heads for recording/reproducing information, provided on one side of a rotary shaft, and at least two coil support portions, each of which supports a coil member for moving the heads on recording media, provided on the other side of the rotary shaft relative to the arm portion, wherein each of the at least two coil support portions extends from either side of a line passing through the head and the rotary shaft, and the at least two coil support portions are formed asymmetrically relative to the line.

The objects described above are also achieved by the actuator structure, wherein the at least two coil support portions are formed asymmetrically relative to the line by varying at least one of length, width, thickness and cross section of the at least two coil support portions.

The objects described above are also achieved by the actuator structure, wherein the at least two coil support portions are formed asymmetrically relative to the line by forming at least one of a notch, a groove and a hole in the at least two coil support portions.

The objects described above are also achieved by the actuator structure, wherein the at least two coil support portions are formed asymmetrically relative to the line by varying at least one of length, width, thickness and cross section of the at least two coil support portions, and forming at least one of a notch, a groove and a hole in the at least two coil support portions.

The objects described above are also achieved by a recording-reproducing apparatus comprising a predetermined number of recording media and a corresponding number of heads for recording/reproducing information, in which each of the heads is mounted on an arm portion of an actuator comprising the arm portion, provided on one side of a rotary shaft, and at least two coil support portions, each of which supports a coil member for moving the heads on the recording media, provided on the other side of the rotary shaft relative to the arm portion, wherein each of the at least two coil support portions extends from either side of a line passing through the head and the rotary shaft, and the at least two coil support portions are formed asymmetrically relative to the line.

The objects described above are also achieved by the recording-reproducing apparatus, wherein the at least two coil support portions are formed asymmetrically relative to the line by varying at least one of length, width, thickness and cross section of the at least two coil support portions.

The objects described above are also achieved by the recording-reproducing apparatus, wherein the at least two coil support portions are formed asymmetrically relative to the line by forming at least one of a notch, a groove and a hole in the at least two coil support portions.

The objects described above are also achieved by the recording-reproducing apparatus, wherein the at least two coil support portions are formed asymmetrically relative to the line by varying at least one of length, width, thickness and cross section of the at least two coil support portions, and forming at least one of a notch, a groove and a hole in the at least two coil support portions.

According to the above actuator structure and the recording-reproducing apparatus, since each of the at least two coil support portions extends from either side of a line passing through the head and the rotary shaft and the at least two coil support portions are formed asymmetrically relative to the line, rigidity of each coil support portion becomes different and therefore a natural frequency for each coil support portions becomes different. Thus, vibration generated during an operation of the actuator is reduced so as to make it possible to achieve a highly accurate positioning and high-speed seek without increasing the weight of the actuator.

The objects described above are also achieved by an actuator structure comprising: an arm portion carrying a predetermined number of heads for recording/reproducing information, provided on one side of a rotary shaft, and at least two coil support portions, each of which supports a coil member for moving the heads on recording media, provided on the other side of the rotary shaft relative to the arm portion, wherein at least one connecting member on which the coil member is mounted is formed at an end portion of each of the at least two coil support portions and a corresponding stopper member is formed in the vicinity of the at least one connecting member.

The objects described above are also achieved by the actuator structure, further comprising a projection which positions the coil member provided at a base portion of each of the at least two coil support portions.

The objects described above are also achieved by the actuator structure, wherein the coil member is fixed to at least one of the connecting member and projection using an adhesive having an anti-vibration property.

The objects described above are also achieved by a recording-reproducing apparatus comprising a predetermined number of recording media and a corresponding number of heads for recording/reproducing information, in which each of the heads is mounted on an arm portion of an actuator comprising the arm portion, provided on one side of a rotary shaft, and at least two coil support portions, each of which supports a coil member for moving the heads on the recording media, provided on the other side of the rotary shaft relative to the arm portion, wherein at least one connecting member on which the coil member is mounted is formed at an end portion of each of the at least two coil support portions and a corresponding stopper member is formed in the vicinity of the at least one connecting member.

The objects described above are also achieved by the recording-reproducing apparatus, further comprising a projection, which positions the coil member, provided at a base portion of each of the at least two coil support portions.

The objects described above are also achieved by the recording-reproducing apparatus, wherein the coil member is fixed to at least one of the connecting member and projection using an adhesive having an anti-vibration property.

According to the above actuator structure and the recording-reproducing apparatus, since at least one connecting member is formed at an end portion of each of the at least two coil support portions and a corresponding stopper member is formed in the vicinity of the at least one connecting member, it is possible to realize a new stopper structure and achieve a highly accurate positioning by decreasing vibration without increasing air gaps of a magnetic circuit.

The objects described above are also achieved by an actuator structure comprising: an arm portion carrying a predetermined number of heads for recording/reproducing information, provided on one side of a rotary shaft, and at least two coil support portions, each of which supports a coil member for moving the heads on recording media, provided on the other side of the rotary shaft relative to the arm portion, wherein the coil member is formed of a substantially trapezoid shape with a central hole, and two sides of the coil member, respectively, as driving effective portions, are formed in an angle which directs towards a center of the rotary shaft.

The objects described above are also achieved by the actuator structure, wherein each of the driving effective portions is formed in a curved shape so that its tangent line directs toward the center of the rotary shaft.

The objects described above are also achieved by a recording-reproducing apparatus comprising a predetermined number of recording media and a corresponding number of heads for recording/reproducing information, in which each of the heads is mounted on an arm portion of an actuator comprising the arm portion, provided on one side of a rotary shaft, and at least two coil support portions, each of which supports a coil member for moving the heads on the recording media, provided on the other side of the rotary shaft relative to the arm portion, wherein the coil member is formed in a substantially trapezoid shape with a central hole, and two sides of the coil member, respectively, as driving effective portions, are formed in an angle which directs towards a center of the rotary shaft.

The objects described above are also achieved by the recording-reproducing apparatus, wherein each of the driving effective portions is formed in a curve shape so that its tangent line directs toward the center of the rotary shaft.

According to the above actuator structure and the recording-reproducing apparatus, since the coil member is formed of a substantially trapezoid shape with at central hole, and two sides of the coil member, respectively, as a driving effective portions, are formed in an angle which directs towards a center of the rotary shaft, it is possible to improve an efficiency of a magnetic circuit and reduce the size and weight of the coil member without deteriorating its performance. Thus, a highly accurate positioning and high-speed seek may be achieved.

Other objects and further features of the present invention will be apparent from the following detailed description when read in conjunction with the accompanied drawings.

DESCRIPTION OF THE PREFERRED EMBODIMENTS

In the following, a principle and embodiments of the present invention will be described with reference to the accompanying drawings.

Figure 4A:
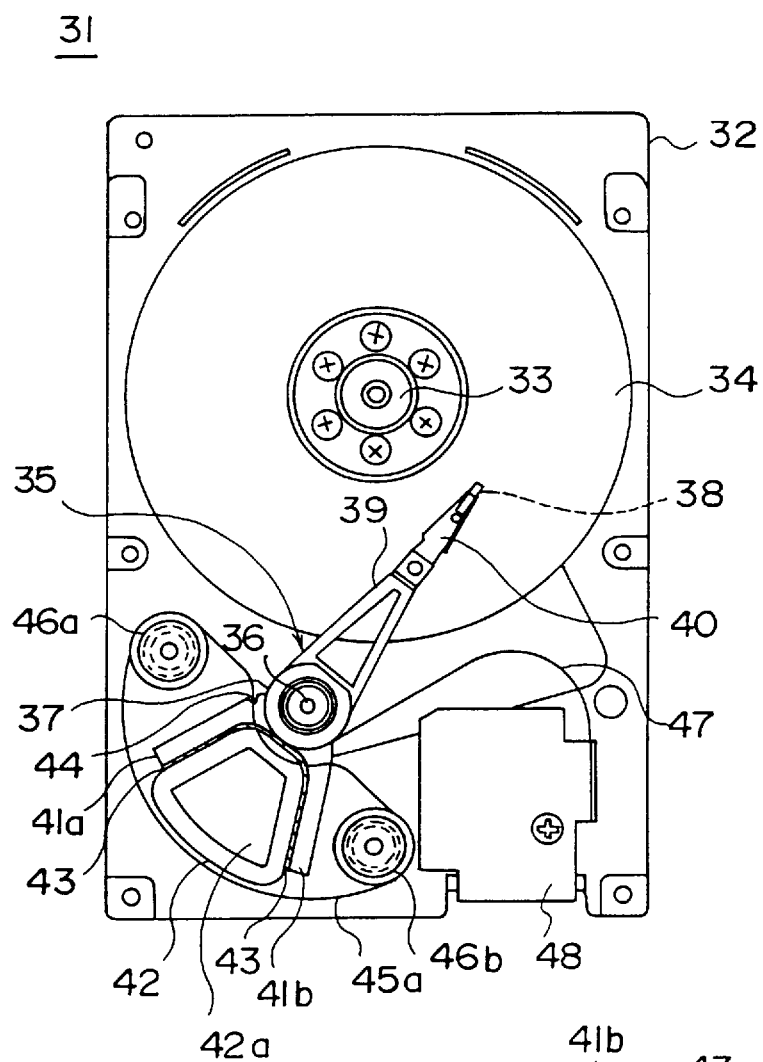
FIG. 4A is a structural diagram of a magnetic disk as a recording-reproducing apparatus according to a first embodiment of the present invention.
Figure 4B:
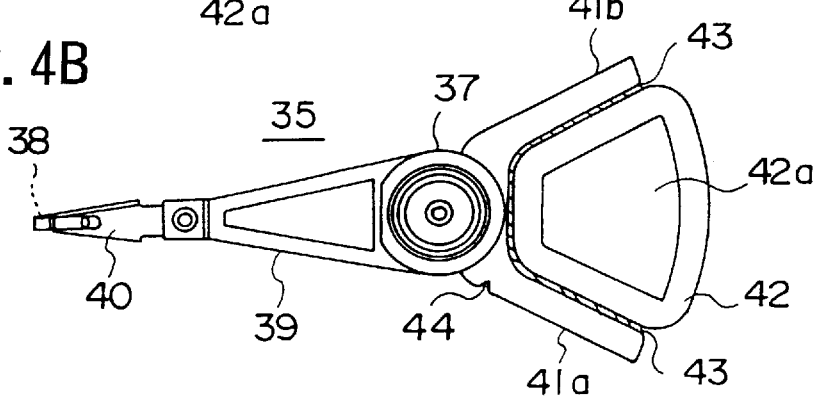
FIG. 4B is a plan view of an actuator according to a first embodiment of the present invention.

First, a description will be given of a first embodiment of an actuator structure and a recording-reproducing apparatus according to the present invention. FIG. 4A is a structural diagram of a magnetic disk 31 as the recording-reproducing apparatus according to the first embodiment of the present invention and FIG. 4B is a plan view of an actuator 35 according to the first embodiment of the present invention. In FIGS. 4A and 4B, a predetermined number of magnetic disks 34 as recording media are fixed to a spindle 33 of a SPM (spindle motor) and are rotated at a predetermined rotational speed in a base member 32.

On the other hand, a rotary shaft 37 of the actuator 35 is rotatably fixed to a shaft 36. A predetermined number of magnetic heads 38 corresponding to a number of magnetic disks 34 (recording surfaces) are mounted on respective gimbals 40 which are fixed to tips of respective arm portions 39.

Also, two coil support portions 41a and 41b are integrally formed on the opposite side of the arm portion 39 and a voice coil 42 is fixed to a U-shape end portion formed by the coil support portions 41a and 41b using an adhesive 43. The two coil support portions 41a and 41b are formed symmetrically to the central axis of the actuator 35 passing through the magnetic head 38 and the center of the rotary shaft 37 and have the same length and width. The only one difference is that a notch 44 is formed in a predetermined position of the coil support portion 41a.

The voice coil 42 is formed by winding a predetermined diameter of coil a certain number of times so that a substantially trapezoid-shaped coil is formed with a central hole portion 42a. Also, magnets (not shown) mounted on a respective yoke 45a or 45b (only 45a is shown) are provided below and above the voice coil 42, respectively. Each of the magnets is mounted so that the S pole of one magnet opposes the N pole of another magnet (refer to a second embodiment). Moreover, both ends of the yokes 45a and 45b are fixed by respective studs 46a and 46b. Further a FPC (flexible printed circuit) 47 for supplying current to the voice coil 42 and sending/receiving signals to/from the magnetic head 38 is provided in connection with an intermediate circuit 48 as shown in FIG. 4A.

A control circuit board (not shown) for controlling the apparatus, which is electrically connected to the intermediate circuit 48, is provided underneath the base member 32 and the base member 32 is covered.

As mentioned above, a notch 44 is formed in the coil support portion 41a of the actuator 35 used for the above magnetic disk apparatus 31 so that its rigidity is different from that of the coil support portion 41b. Therefore, vibration generated by the operation of the voice coil 42 is transferred differently for the coil support portion 41a as compared to the coil support portion 41b. That is, the resonance points are different for the coil support portions 41a and 41b. Thus, by forming the coil support portion 41a and 41b with a respective size (thickness) by which resonance peaks cancel each other, it is possible to reduce vibrations generated during an operation of the actuator 35 and to carry out a positioning of the magnetic head 38 with high accuracy without being influenced by the vibration. Also, since each of the coil support portions can be formed small, a weight reduction may be achieved and a high-speed seek may be realized.

Figure 5:
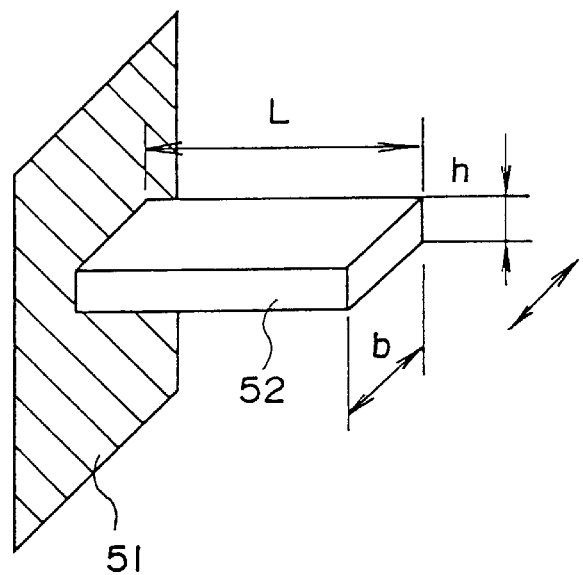
FIG. 5 is a diagram for explaining a principle of the mechanism of resonance.

FIG. 5 is a diagram for explaining a principle of the mechanism of resonance. In FIG. 5, one end of a beam 52 is fixed to a fixing portion 51. Now, a natural frequency f of the beam 52 when vibrated in a direction indicated by an arrow is expressed by the following equation:

$$f=(\lambda^2/2\pi L^2)\sqrt{(EIg/\rho A)}(I=(1/12)bh^3, A=bh)$$

where L indicates a length (cm) of the beam 52, λ indicates a vibrational mode (here, a first order vibrational frequency $\lambda_1=1.875$), E indicates a lengthwise elastic modulus ($7\times10^5$ kg/cm$^2$ when aluminum is used), I indicates cross-section secondary moment, g indicates the apparent gravity (980 cm/s$^2$), ρ indicates the density of the material ($2.7\times10^{-3}$ kg/cm$^2$), A indicates a cross section (cm$^2$), b indicates a width (cm) and h indicates a thickness (cm).

Therefore, due to the formation of the notch 44 in the coil support portion 41a as shown in FIG. 4, A (cross section) in the above equation varies and so the natural frequency also changes.

Figure 6:
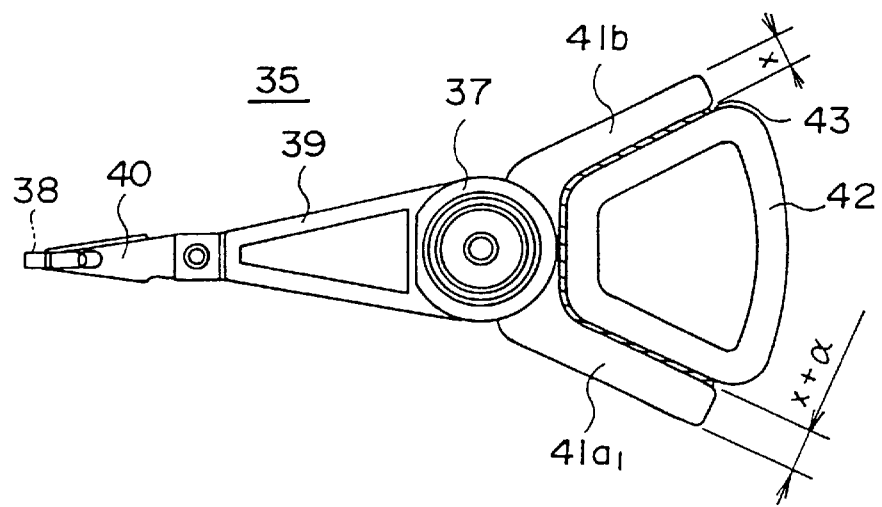
FIG. 6 shows a structural diagram of another example of the actuator according to the first embodiment of the present invention.

FIGS. 6 to 9 show structural diagrams of other examples of the actuator 35 according to the first embodiment of the present invention. In FIG. 6, the width (x+α) of the coil support portion $41a_1$ of the actuator 35 is made wider than the width (x) of the coil support portion 41b. The other configurations are the same as the ones shown in FIG. 6. Thus, b of the above equation is changed and so the natural frequency f of the coil support portion $41a_1$ is also changed.

Figure 7A:
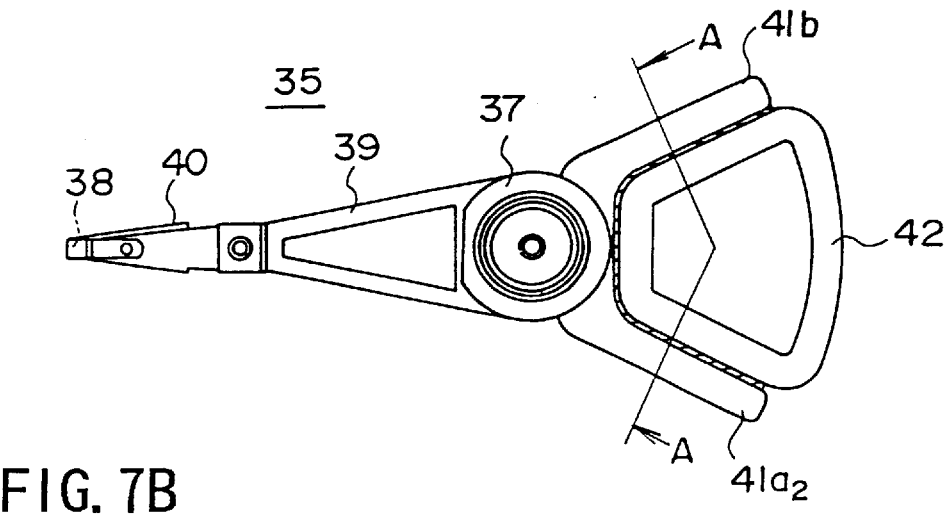
FIG. 7A shows a structural diagram of another example of the actuator according to the first embodiment of the present invention.
Figure 7B:
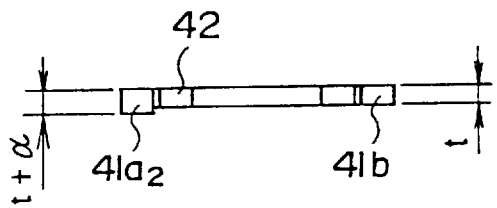
FIG. 7B is a cross-sectional view of the actuator shown in FIG. 7A cut along A—A.

FIG. 7A is a plan view of the actuator 35 and FIG. 7B is a cross-sectional view cut along an A—A line indicated in FIG. 7A. In FIGS. 7A and 7B, the thickness (t+α) of the coil support portion $41a_2$ of the actuator 35 is made wider than the thickness (t) of the coil support portion 41b. The other configurations are the same as the ones shown in FIG. 6. Thus, h of the above equation is changed and so the natural frequency f of the coil support portion $41a_2$ is also changed.

Figure 8:
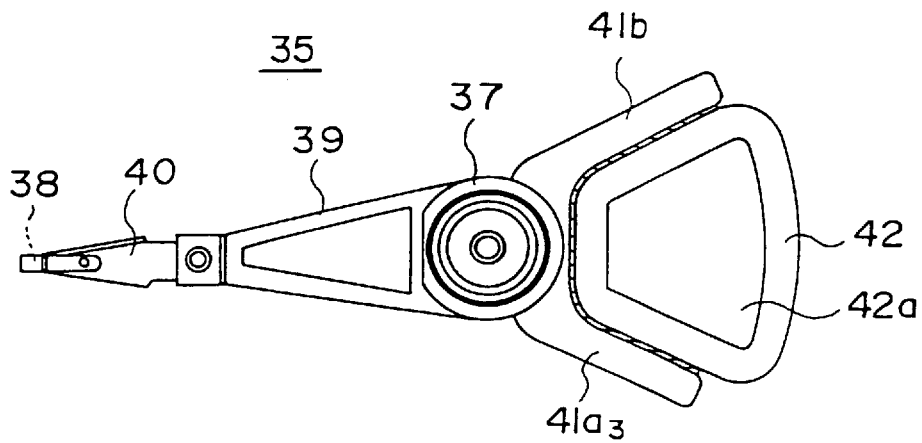
FIG. 8 shows a structural diagram of another example of the actuator according to the first embodiment of the present invention.

FIG. 8 is a plan view of another example of the actuator 35. In FIG. 8, the length of the coil support portion $41a_3$ of the actuator 35 is made shorter than the length of the coil support portion 41b. The other configurations are the same as the ones shown in FIG. 6. Thus, L of the above equation is changed and so the natural frequency f of the coil support portion $41a_3$ is also changed.

Figure 9:
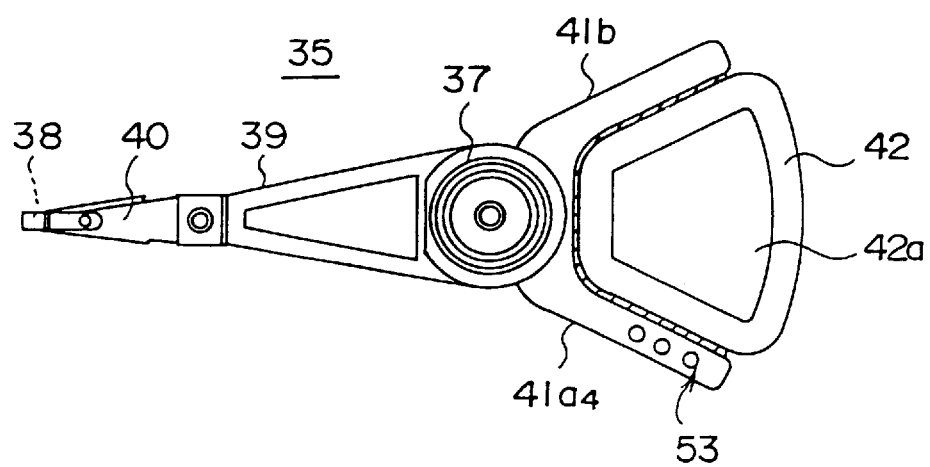
FIG. 9 shows a structural diagram of another example of the actuator according to the first embodiment of the present invention.

FIG. 9 is a plan view of another example of the actuator 35. In FIG. 8, a predetermined number of holes 53 are formed in the coil support portion $41a_4$ of the actuator 35. The other configurations are the same as the ones shown in FIG. 6. Thus, elements such as A of the above equation are changed and so the natural frequency f of the coil support portion $41a_4$ is also changed.

In addition, a cross section of a certain portion of each of the coil support portions, $41a_1$, $41a_2$ and $41a_4$ shown in FIGS. 6, 7 and 9, respectively, is formed differently, compared to that of a corresponding portion of the coil support portion 41b, so that the natural frequency f of one of the coil support portions becomes different from that of the other.

As mentioned above, according to the present invention, it is possible to change the resonance point generated by the voice coil 42 of the actuator 35 in order to decrease the vibration and, hence, it is possible to carry out a highly accurate positioning sufficiently applicable to a narrow track pitch.

Figure 10:
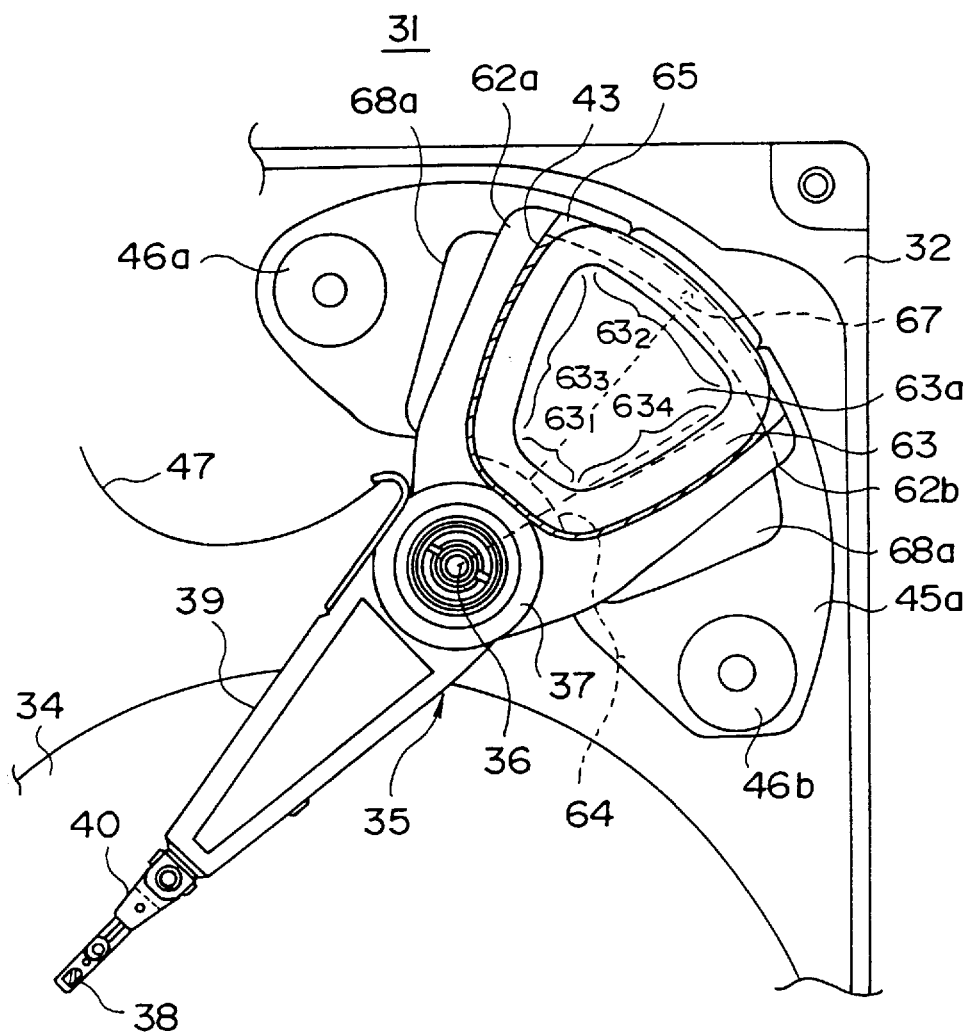
FIG. 10 is a plan view of an actuator portion of a magnetic disk according to a second embodiment of the present invention.
Figure 11:
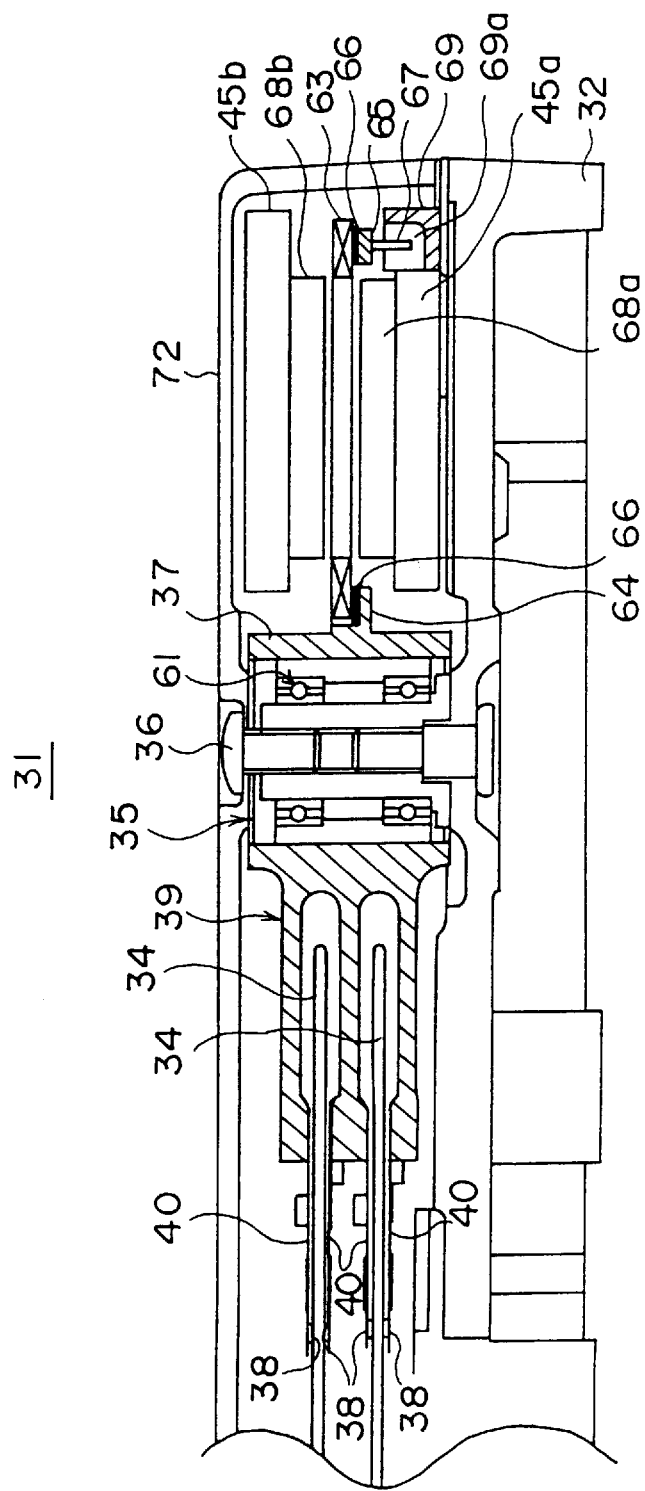
FIG. 11 is a cross-sectional view of the actuator portion shown in FIG. 10.

FIG. 10 is a plan view of an actuator 35 portion of a magnetic disk 31 according to a second embodiment of the present invention. FIG. 11 is a cross-sectional view of the actuator portion shown in FIG. 10. Note that the same number is used for the same elements corresponding to the ones used in the first embodiment.

FIGS. 10 and 11 shows a magnetic disk 31 of which a predetermined number of magnetic disks 34 (two in FIG. 11) are rotated by a spindle motor (not shown) in a base member 32 and a magnetic head 38 mounted on the actuator 35 is moved in a radial direction on a corresponding surface of each of the magnetic disks 34.

The actuator 35 is comprised, integrally, of a rotary shaft 37, which is formed by a shaft 36 and bearings 61, and arms 39, a number of which corresponds to a number (of recording surfaces) of the magnetic disks 34, provided so as to hold each of the magnetic disks 34. A gimbal 40 is fixed to a tip of each of the arms 39 and the magnetic head 34 is formed on each of the gimbals 40 so as to oppose each recording surface of the magnetic disks 34.

On the other hand, two coil support portions 62a and 62b are integrally and symmetrically formed on the other side of the magnetic disk 34 and a voice coil 63 is fixed to a U-shaped end portion formed by the coil support portions 62a and 62b using an adhesive 43. The voice coil 63 is formed by winding the coil a certain number of times so that a substantially trapezoid-shaped coil is formed with a central hole portion 63a. The voice coil 63 has two sides $63_1$, and $63_2$, which are substantially parallel to the rotational direction of the actuator 35, and two other sides $63_3$ and $63_4$ which are substantially vertical to the rotational direction of the actuator 35. In this case, the sides $63_3$ and $63_4$ become coil effective portions during an operation of the actuator 35. The sides $63_3$ and $63_4$ are curved so that a tangent line of each passes through the center of the rotation shaft 37.

A projection 64 is formed at the base of each of the coil support portions 62a and 62b and a connecting member 65 for connecting the coil support portions 62a and 62b are provided at the end portion thereof. The sides $63_1$ and $63_2$ of the voice coil 63 are mounted on the projection 64 and the connecting member 65 and adhered using an adhesive having a vibration preventing property. In this case, the projection 64 functions as a positioning element for the setting of the voice coil 63. Also, a pin 67 is used as a stopper member for the connecting member 65. In addition, the pin 67 can be used not only for the connecting member 65 but also for the tip of either coil support portion 62a or 62b.

On the other hand, a magnet 68b mounted on a yoke 45b is provided above the voice coil 63 and a magnet 68a mounted on a yoke 45a is provided below the voice coil 63. Each of the magnets 68a and 68b are positioned so that its polarity changes around the central portion. Studs 46a and 46b are provided at an end of the respective yokes 45a and 45b. The numeral 47 indicates a FPC (flexible printed circuit) for supplying current to the voice coil 63 and communicating with the magnetic head 38 as mentioned above.

Also, a stopper member 69 having a stopper groove 69a, corresponding to the pin 67, for restricting a rotational range of the actuator 35, is provided as shown in FIG. 11 and the pin 67 is positioned in the groove 69a.

Figure 12:
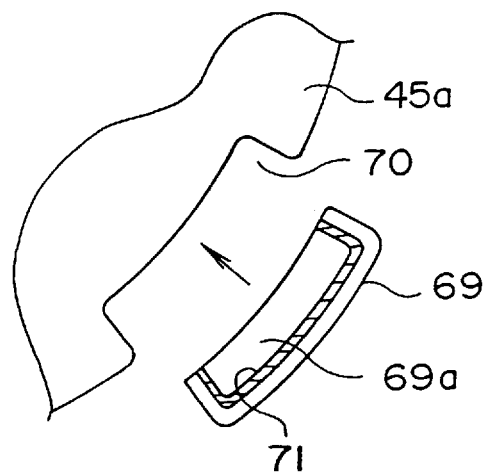
FIG. 12 is a structural diagram showing a part of a stopper according to the present invention.

FIG.12 is a structural diagram showing a part of the stopper 69 according to the present invention. In FIG. 12, a notch 70 is formed in an outer periphery portion of the yoke 45a and the stopper groove 69a of the stopper member 69 is engaged with the notch 70 and fixed using an adhesive. A rubber member 71 as an elastic member is fixed to the stopper groove 69a. It is sufficient if the rubber member 71 is provided at least with the contacting portion to the pin 67.

That is, the rotation of the actuator 35 is stopped when the pin 67 touches an end of the groove 69a of the stopper portion 69. At that time, the rubber member 71 absorbs the shock and prevents a generation of vibrations. It is noted that the pin 67 as the stopper member contributes to a decreased in the vibration.

Figure 13:
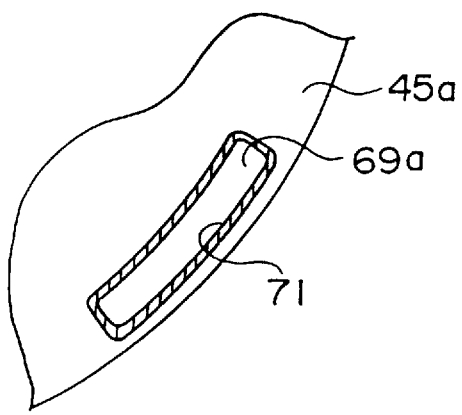
FIG. 13 is a structural diagram showing a part of another stopper according to the present invention.

FIG. 13 is a structural diagram showing a part of another stopper 69 according to the present invention. In FIG. 13, a stopper groove 69a is formed at an outer periphery of a yoke 45a and a rubber member 71 is provided on an inner wall of the groove 69a.

Referring back to FIG. 11, a control circuit (not shown) for controlling the apparatus is provided underneath the base member 32 and the base member 32 is covered by a cover 72 to be sealed.

Since the connecting member 65 and the projection 64 are formed at the end and the base of the coil support portions 62a and 62b, respectively, to mount and fix the voice coil 63, it is possible to improve the rigidity of the entire coil support portions 62a and 62b of the actuator 35 of the magnetic disk apparatus 31 according to the present invention. Also, by using the above structure of the actuator 35, it is possible to increase the natural frequency f of the coil support portions 62a and 62b and, hence, to improve a resonance margin as shown in the above equation. Moreover, it is possible to further improve the resonance margin by using an adhesive having a vibration preventing property.

As mentioned above, according to the present invention, it is possible to carry out a highly accurate positioning of the magnetic head 38 and a high-speed seek by using the above-mentioned configuration of the actuator 35 and the magnetic disk apparatus 31. Also, the weight of the voice coil 63 is reduced (about 10%), of which fact also contributes to the high performance of the present invention. A comparison of the voice coil structure according to the present invention with that of the prior art is tabulated in the TABLE 1 below.

TABLE 1

|  | Prior art | P. invention | Difference |
|---|---|---|---|
| Diameter of coil (mm) | φ0.15 | φ0.15 |  |
| No. of turns | 156 | 156 |  |
| Weight (g) | 1.94 | 1.85 | 4.6% |
| Inertia (g · cm$^2$) | 11.23 | 11.12 | 1% |
| Effective length (m) | 5.491 | 5.491 |  |
| Resistance (Ω) | 11.97 | 11.73 |  |

Figure 1:
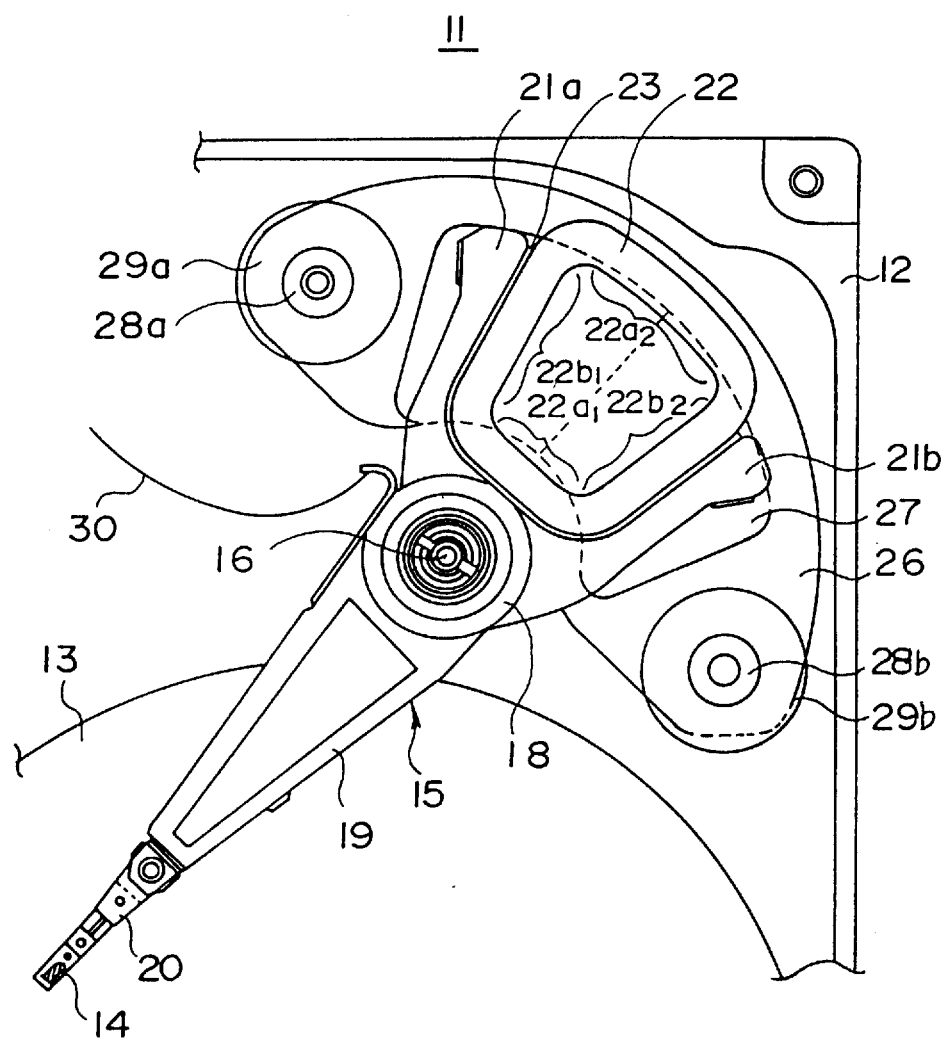
FIG. 1 is a plan view of an actuator portion of a conventional magnetic disk apparatus.
Figure 2:
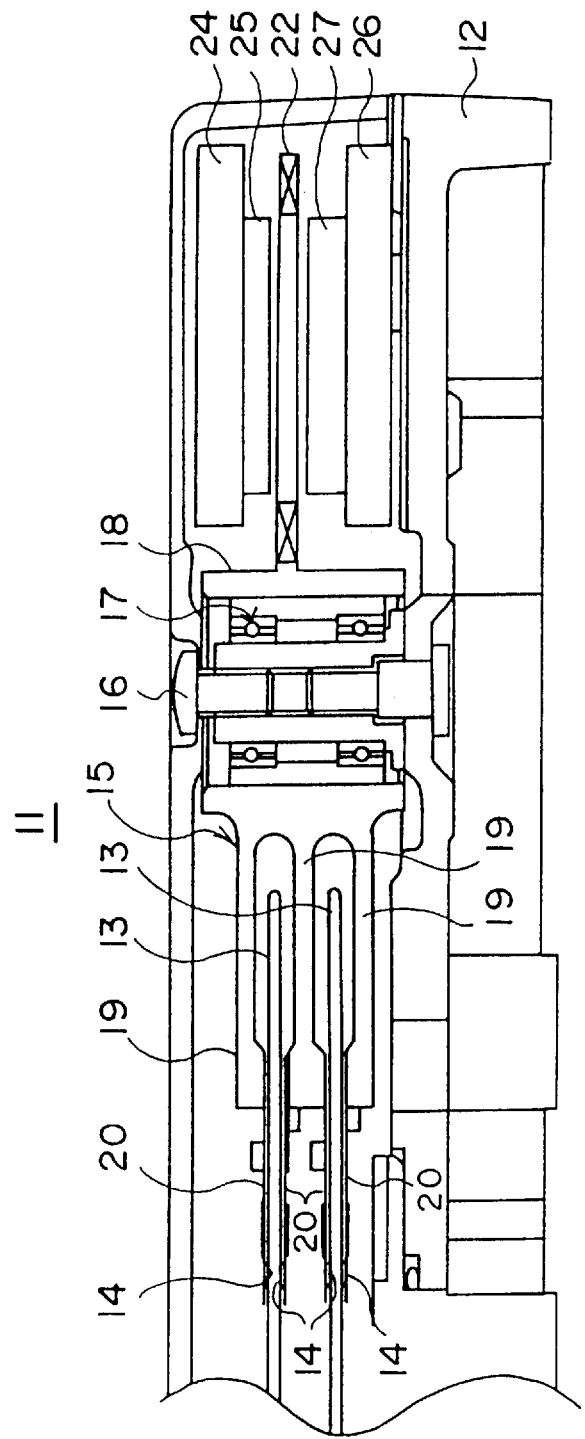
FIG. 2 is a cross-sectional view of the actuator portion shown in FIG. 1.
Figure 3:
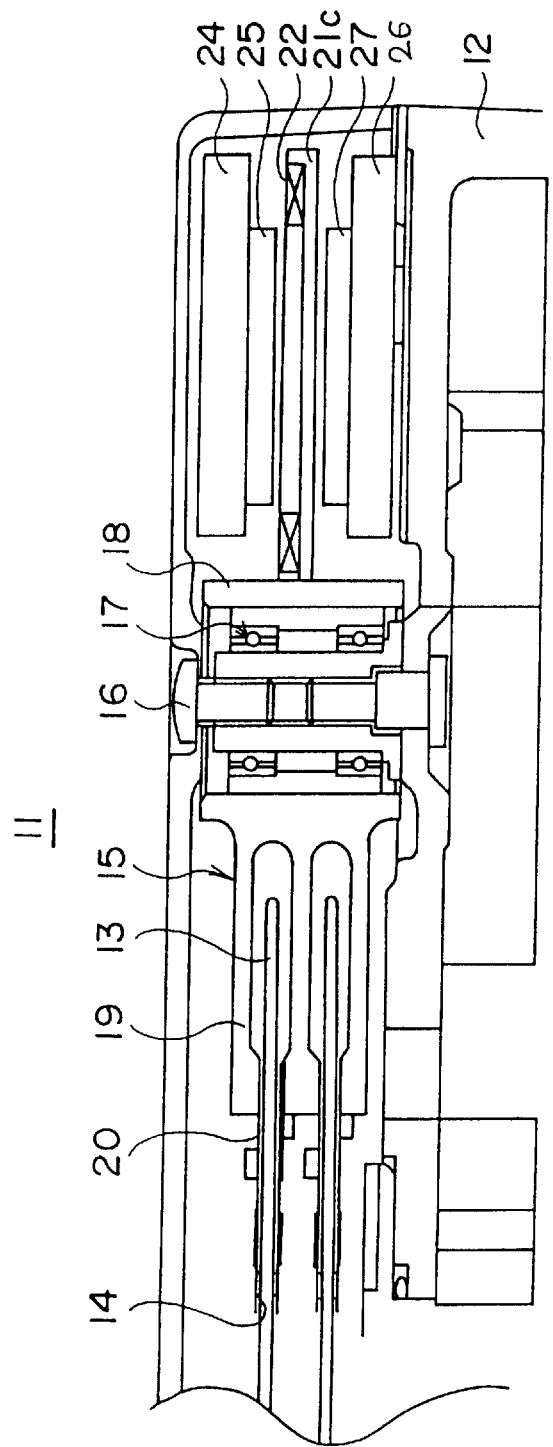
FIG. 3 is a cross-sectional view of another conventional actuator structure.

As shown in the TABLE 1, the diameter of the coil and the number of the turns in the voice coil structure are 0.15 mm and 156, respectively for both the prior art (shown in FIG. 1) and the present invention (second embodiment). On the other hand, the weight, inertia, effective length (the sides $22b_1$ and $22b_2$ shown in FIG. 1) and resistance of the prior art are 1.94 g, 11.23 g·cm$^2$, 5.491 m and 11.97 Ω, respectively. However, according to the present invention, since the sides $63_3$ and $63_4$ (coil effective portions) are curved so that a tangent line of each passes through the center of the rotation shaft 37, the side $63_1$ can be shortened compared to that of the prior art. Therefore, the weight, inertia, effective length and resistance of the present invention are 1.85 g, 11.12 g·cm$^2$, 5.491 m and 11.73 Ω, respectively. Hence the weight and the inertia are decreased 4.6% and 1%, respectively, compared with those of the prior art.

Figure 14A:
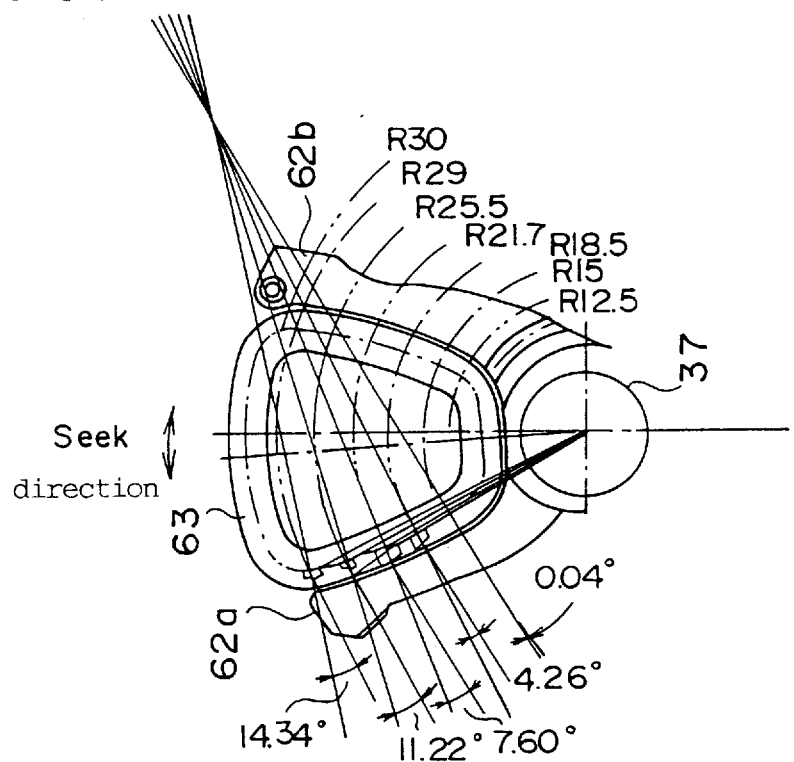
FIG. 14A is a diagram for explaining torque ratios shown in TABLE 2.
Figure 14B:
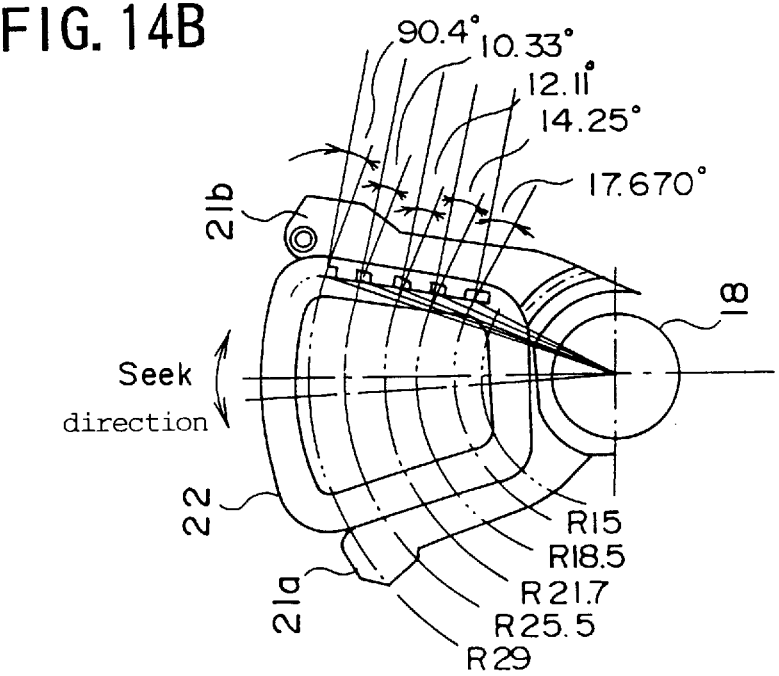
FIG. 14B is also a diagram for explaining torque ratios shown in TABLE 2.

Next, torque ratios of the present invention compared with those of the prior art are tabulated in the TABLE 2. Also, diagrams for explaining a comparison of torque ratios are shown in FIGS. 14A and 14B. In FIG. 14A, a structure according to the present invention is shown and a structure according to the prior art is shown in FIG. 14B.

TABLE 2

|  | Prior art | | Present invention | |
|---|---|---|---|---|
|  | angle (deg.) | torq. ratio | angle (deg.) | torq. ratio |
| R15 | 17.67 | 14.29 | 0.04 | 15.00 |
| R18.5 | 14.25 | 17.93 | 4.26 | 18.45 |
| R21.7 | 12.11 | 21.22 | 7.60 | 21.51 |
| R25.5 | 10.33 | 25.09 | 11.22 | 25.01 |
| R29.0 | 9.04 | 28.64 | 14.34 | 28.10 |
| TOTAL | — | 107.17 | — | 108.07 (+0.8%) |

In TABLE 2, R15, R18.5, R21.7, R25.5 and R29.0, respectively, indicate a radius of the coil effective portion $63_3$, $63_4$, ($22_1$, $22_2$) from the rotary shaft 37 (18). Also, results obtained by comparing torque efficiency at a center of each coil width from a seek direction and coil normal line are shown in TABLE 2. In this case, the torque ratio is calculated by R cos Θ (Θ is an angle (deg.)).

As shown in the TABLE 2, the total torque of the present invention is improved by 0.8% compared with that of the prior art. Thus, it is possible to achieve high performance of the apparatus by adopting the configuration of the voice coil 63 as shown in FIG. 10.

Although the present invention is described for the magnetic actuator structure and recording-reproducing apparatus, it is possible to apply the same principle to other actuator structures and recording-reproducing apparatus such as an optical actuator structure and a recording-reproducing apparatus.

Also, it is obvious that the present invention is not limited to the above-mentioned embodiments, and variations and modifications may be made without departing from the scope of the present invention.

What is claimed is:

1. An actuator structure comprising:

an arm portion carrying a predetermined number of heads for recording/reproducing information, provided on one side of a rotary shaft, and at least two coil support portions, each of which supports a coil member for moving said heads on recording media, provided on the other side of said rotary shaft relative to said arm portion, said at least two coil support portions defining a first coil support portion and a second coil support portion, wherein each of said at least two coil support portions extends in the same general direction as a line passing through said heads and said rotary shaft, each said coil support portion extending along opposite sides of said line, and said at least two coil support portions arc formed asymmetrically relative to said line, wherein said first and second coil support portions each have a thickness generally extending parallel to a rotational axis of said rotary shaft, and said first and second coil support portions each have a generally uniform cross section, at least one of said respective thicknesses and said respective cross sections being different to create asymmetrical resonance points relative to said line.

2. An actuator structure comprising:

an arm portion carrying a predetermined number of heads for recording/reproducing information, provided on one side of a rotary shaft, at least two coil support portions, each of which supports a coil member for moving said heads on recording media, provided on the other side of said rotary shaft relative to said arm portion, at least one connecting member on which said coil member is mounted, said connecting member formed at an end portion of each of said at least two coil support portions, and a corresponding stopper member formed in the vicinity of said at least one connecting member, said at least one connecting member including a pin, wherein rotational movement of the actuator structure is restricted by said stopper when said pin contacts said stopper.

3. The actuator structure as claimed in claim 2, further comprising a projection, which positions said coil member, provided at a base portion of each of said at least two coil support portions.

4. The actuator structure as claimed in claim 3, wherein said coil member is fixed to at least one of said connecting member and projection using an adhesive having an anti-vibration property.

5. The actuator structure as claimed in any one of claims 2 to 4, wherein said coil member is formed of a substantially trapezoid shape with a central hole, and two sides of said coil member, respectively, as driving effective portions, are formed in an angle which converges towards a center of said rotary shaft.

6. The actuator structure as claimed in claim 5, wherein each of said driving effective portions is formed in a curve shape so that its tangent line is directed towards the center of said rotary shaft.

7. An actuator structure comprising:

an arm portion carrying a predetermined number of heads for recording/reproducing information, provided on one side of a rotary shaft, and at least two coil support portions, each of which supports a coil member for moving said heads on recording media, provided on the other side of said rotary shaft relative to said arm portion, wherein said coil member is formed of a substantially trapezoid shape with a central hole and having a front coil portion, a back coil portion and two sides, each said side having a first end connected to said front coil portion and a second end connected to said back coil portion, each said side of said coil member, respectively, as driving effective portions, being formed in a continuous curve shape from said first end to said second end so that its tangent line is directed towards the center of said rotary shaft.

8. A recording-reproducing apparatus comprising:

a predetermined number of recording media and a corresponding number of heads for recording/reproducing information, in which each of said heads is mounted on an arm portion of an actuator including said arm portion, provided on one side of a rotary shaft, at least two coil support portions, each of which supports a coil member for moving said heads on said recording media, provided on the other side of said rotary shaft relative to said arm portion, said at least two coil support portions defining at least a first coil support portion and a second coil support portion, wherein each of said at least two coil support portions extends in the same general direction as a line passing through said head and said rotary shaft, each said coil support portion extending along opposite sides of said line, and said at least two coil support portions are formed asymmetrically relative to said line, wherein said first and second coil support portions each have a thickness generally extending parallel to a rotational axis of said rotary shaft, and said first and second coil support portions each have a generally uniform cross section, at least one of said respective thicknesses and said respective cross sections being different to create asymmetrical resonance points relative to said line.

9. A recording-reproducing apparatus comprising:

a predetermined number of recording media and a corresponding number of heads for recording/reproducing information, in which each of said heads is mounted on an arm portion of an actuator including said arm portion, provided on one side of a rotary shaft, at least two coil support portions, each of which supports a coil member for moving said heads on said recording media, provided on the other side of said rotary shaft relative to said arm portion, at least one connecting member on which said coil member is mounted, said connecting member formed at an end portion of each of said at least two coil support portions, and a corresponding stopper member formed in the vicinity of said at least one connecting member, said at least one connecting member including a pin, wherein rotational movement of the actuator is restricted by said stopper when said pin contacts said stopper.

10. The recording-reproducing apparatus as claimed in claim 9, further comprising a projection, which positions said coil member, provided at a base portion of each of said at least two coil support portions.

11. The recording-reproducing apparatus as claimed in claim 10, wherein said coil member is fixed to at least one of said connecting member and projection using an adhesive having an anti-vibration property.

12. The recording-reproducing apparatus as claimed in any one of claims 9 to 11, wherein said coil member is formed in a substantially trapezoid shape with a central hole, and two sides of said coil member, respectively, as driving effective portions, are formed in an angle which converges towards a center of said rotary shaft.

13. The recording-reproducing apparatus as claimed in claim 12, wherein each of said driving effective portions is formed in a curve shape so that its tangent line is directed towards the center of said rotary shaft.

14. A recording-reproducing apparatus comprising:

a predetermined number of recording media and a corresponding number of heads for recording/reproducing information, in which each of said heads is mounted on an arm portion of an actuator including said arm portion, provided on one side of a rotary shaft, and at least two coil support portions, each of which supports a coil member for moving said heads on said recording media, are provided on the other side of said rotary shaft relative to said arm portion, wherein said coil member is formed in a substantially trapezoid shape with a central hole and having a front coil portion, a back coil portion and two sides, each said side having a first end connected to said front coil portion and a second end connected to said back coil portion, each said side of said coil member, respectively, as driving effective portions, being formed in a continuous curve shape from said first end to said second end so that its tangent line directed towards the center of said rotary shaft.

15. An actuator structure comprising:

an arm portion carrying a predetermined number of heads for recording/reproducing information, provided on one side of a rotary shaft, at least two coil support portions, each of which supports a coil member for moving said heads on recording media, provided on the other side of said rotary shaft relative to said arm portion, said at least two coil support portions defining at least a first coil support portion and a second coil support portion, wherein each of said at least two coil support portions extends in the same general direction as a line passing through said head and said rotary shaft, each said coil support portion extending along opposite sides of said line, and said at least two coil support portions are formed asymmetrically relative to said line, wherein at least one of a notch formed in said first coil support portion near an end of said first coil support portion connected to said rotary shaft and a hole formed in said first coil support portion forms a first coil support portion cross section different from a corresponding second coil support portion cross section of said second coil support portion so that said difference in cross sections creates asymmetrical resonance points relative to said line.

16. A recording-reproducing apparatus comprising:

a predetermined number of recording media and a corresponding number of heads for recording/reproducing information, in which each of said heads is mounted on an arm portion of an actuator including said arm portion, provided on one side of a rotary shaft, at least two coil support portions, each of which supports a coil member for moving said heads on said recording media, provided on the other side of said rotary shaft relative to said arm portion, said at least two coil support portions defining at least a first coil support portion and a second coil support portion wherein each of said at least two coil support portions extends in the same general direction of a line passing through said head and said rotary shaft, each said coil support portion extending along opposite sides of said line, and said at least two coil support portions are formed asymmetrically relative to said line, wherein at least one of a notch formed in said first coil support portion near an end of said first coil support portion connected to said rotary shaft and a hole formed in said first coil support portion forms a first coil support portion cross section different from a corresponding second coil support portion cross section of said second coil support portion so that said difference in cross sections creates asymmetrical resonance points relative to said line.

* * * * *